(12) United States Patent
Kobayashi

(10) Patent No.: US 11,625,474 B2
(45) Date of Patent: Apr. 11, 2023

(54) ELECTRONIC APPARATUS WITH TWO LOGIN TYPES

(71) Applicant: SEIKO EPSON CORPORATION, Tokyo (JP)

(72) Inventor: Ayako Kobayashi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 233 days.

(21) Appl. No.: 17/082,952

(22) Filed: Oct. 28, 2020

(65) Prior Publication Data

US 2021/0133307 A1  May 6, 2021

(30) Foreign Application Priority Data

Oct. 30, 2019  (JP) .............................. JP2019-197248

(51) Int. Cl.
  *G06F 21/40*  (2013.01)
  *G06F 3/12*  (2006.01)
(52) U.S. Cl.
  CPC ............ *G06F 21/40* (2013.01); *G06F 3/1204* (2013.01); *G06F 3/1222* (2013.01); *G06F 3/1238* (2013.01); *G06F 3/1279* (2013.01)

(58) Field of Classification Search
  None
  See application file for complete search history.

(56) References Cited

U.S. PATENT DOCUMENTS

2015/0009529 A1* 1/2015 Osuki .................. G06F 3/1238
                                                                    358/1.15
2019/0377525 A1* 12/2019 Nakajima ............. G06F 3/1222

FOREIGN PATENT DOCUMENTS

JP         2018023163 A     2/2018

* cited by examiner

*Primary Examiner* — Thomas D Lee
(74) *Attorney, Agent, or Firm* — Chip Law Group

(57) ABSTRACT

An electronic apparatus includes: a first acceptor that accepts a first login; a second acceptor that accepts a second login; and an execution section. When the first login is a success, the execution section causes the electronic apparatus to perform a predetermined function only once without a user's operation. When the second login is a success, the execution section causes the electronic apparatus to perform a function in accordance with a user's operation.

9 Claims, 3 Drawing Sheets

ELECTRONIC APPARATUS WITH TWO LOGIN TYPES

The present application is based on, and claims priority from JP Application Serial Number 2019-197248, filed Oct. 30, 2019, the disclosure of which is hereby incorporated by reference herein in its entirety.

BACKGROUND

1. Technical Field

The present disclosure relates to an electronic apparatus and a non-transitory computer-readable storage medium. More specifically, the present disclosure relates to user authentication performed by the electronic apparatus in accordance with a program stored in the non-transitory computer-readable storage medium.

2. Related Art

Some known electronic apparatuses require user authentication through a user's login, logon, or sign-in, for example, before performing a predetermined function. Other electronic apparatuses enter a sleep mode if not operated over a predetermined period and require an authentication procedure to recover from the sleep mode. For example, JP-A-2018-23163 discloses an electronic apparatus that, when a user changes a setting, display this changed setting and then automatically clears the display when a predetermined period has passed (e.g., refer to paragraphs 0086 and 0093).

Electronic apparatus as described above have some administrative problems. For example, if a login user A operates an electronic apparatus and then temporality leaves, this electronic apparatus can be operated as the user A by a third party, such as a user B, unless a predetermined period has passed since the last operation.

SUMMARY

The present disclosure is an electronic apparatus that includes: a first acceptor that accepts a first login; a second acceptor that accepts a second login; and an execution section. When the first login is a success, the execution section causes the electronic apparatus to perform a predetermined function only once without a user's operation. When the second login is a success, the execution section causes the electronic apparatus to perform a function in accordance with a user's operation.

The above electronic apparatus permits a first-login user to use a predetermined function only once without a user's operation but does not permit a third party to use any function after the first-login user has used the function. To operate in this manner after the first login, this electronic apparatus requires no user's explicit operation, such as a logout operation, thus facilitating the administrator's appropriate management. Consequently, this configuration, at least when accepting the first login, successfully reduces the risk of the electronic apparatus operated by a third party. Furthermore, since the electronic apparatus permits the user to use a predetermined function without a user's operation such as an operation of selecting a function after the first login, the electronic apparatus successfully provides improved usability for the user. Consequently, with the configuration that can accept the second login in addition to the first login, the electronic apparatus is less likely to be operated accidentally than any other electronic apparatus that can accept only the second login.

When the first login is a success, the execution section may cause the electronic apparatus to perform the predetermined function only once without a user's operation and then may ban the electronic apparatus from performing any function until a next first login or the second login has been a success. This configuration requests the first-login user to perform the first login or the second login if he/she wishes to further use any function after having used the function only once. Thus, at least after the first login has been a success and the first-login user has used the function only once, the configuration does not permit a third party to use any function. Therefore, with the configuration, the electronic apparatus is less likely to be operated accidentally.

When the second login is a success, the execution section may permit a user to use a function a plurality of times. In short, the electric apparatus permits the second-login user to use the function not only once but also a plurality of times. More specifically, the electric apparatus permits the second-login user to use a function a plurality of times without requesting the second login again. In this way, the electric apparatus reduces a user's burden of repeating the second login. This configuration provides improved usability for the user who needs to perform a plurality of functions a plurality of times.

After the success of the second login, the execution section may ban the electronic apparatus from performing any function in response to an event in which a user performs a logout operation or in which the user does not perform an operation over a predetermined period and may continue to ban the electronic apparatus from performing any function until the first login or a next second login has been a success. This configuration successfully reduces the risk of the electronic apparatus operated by a third party after the second-login user explicitly performs the logout operation. In addition, when a user does not perform an operation over a predetermined period, the configuration bans the user from using any function and continues this situation unless he/she performs the first or second login. Therefore, the electric apparatus is less likely to be used by a third party than any other electronic apparatus that lacks this configuration when the second-login user fails to perform an explicit logout operation.

The above electronic apparatus may further include: one or more first buttons through which the first login is accepted; and a second button through which the second login is accepted. The first buttons and the second button may be arranged in parallel to each other. This configuration, in which the first buttons and the second button are arranged in parallel to each other in the electronic apparatus, enables the user to individually operate the first buttons and the second button with substantially the same effort. Moreover, the configuration enables the user to recognize that it is necessary to operate one of the first buttons in order to perform the first login and to operate the second button in order to perform the second login.

The electronic apparatus may be configured to perform a plurality of functions. One of the first buttons is linked to a first function, whereas another of the first buttons is linked to a second function. The first buttons and the second button are arranged in parallel to one another. When one of the first buttons is operated, the execution section causes the electronic apparatus to perform a function to which the operated first button is linked without requesting the user to perform an operation of selecting a function after the first login. When the second button is operated, the execution section requests the user to perform the operation of selecting a function and causes the electronic apparatus to perform the selected function after the second login. This configuration reduces a user's burden of selecting the first function again after he/she has operated the first button linked to the first function and performed the first login. Likewise, the configuration reduces a user's burden of selecting the second function again after he/she has operated the first button linked to the second function and performed the first login. In short, the operation of the first buttons serves as the operation of selecting a function. Thus, this configuration enables the first-login user to use a desired function with just a few operations. In addition, the configuration enables the second-login user who has operated the second button to select a desired function from among a plurality of functions. Therefore, for example, the configuration permits the user to sequentially use a plurality of functions or use the same function a plurality of times without requesting the user to perform the login operation again, thereby providing improved usability for the user.

The electronic apparatus may be configured to perform a plurality of functions. The execution section may permit the user to perform more functions after the second login than after the first login. This configuration enables the first-login user to perform one of some specific functions once with just a few operations. In addition, the configuration permits the second-login user to perform more functions than the first-login user without requesting the second-login user to perform a login operation again.

The functions that the execution section permits the user to perform after the first login may be preselected from among those that the execution section permits the user to perform after the second login. Thus, this configuration may permit the first-login user to use, for example, a function to be used frequently by users, a function to be performed with a default setting value, or a series of functions to be performed in order in an MFP. In this way, the configuration enables the first-login user to use those functions with just a few operations. In addition, the configuration may permit the second-login user to use many more functions, including the above functions. In this way, the configuration enables the user to use, for example, a function to be used less frequently and a function that the first-login user is permitted to use but that involves changing setting values, after having selected the function and changed the setting values.

DESCRIPTION OF EXEMPLARY EMBODIMENTS

Figure 1:
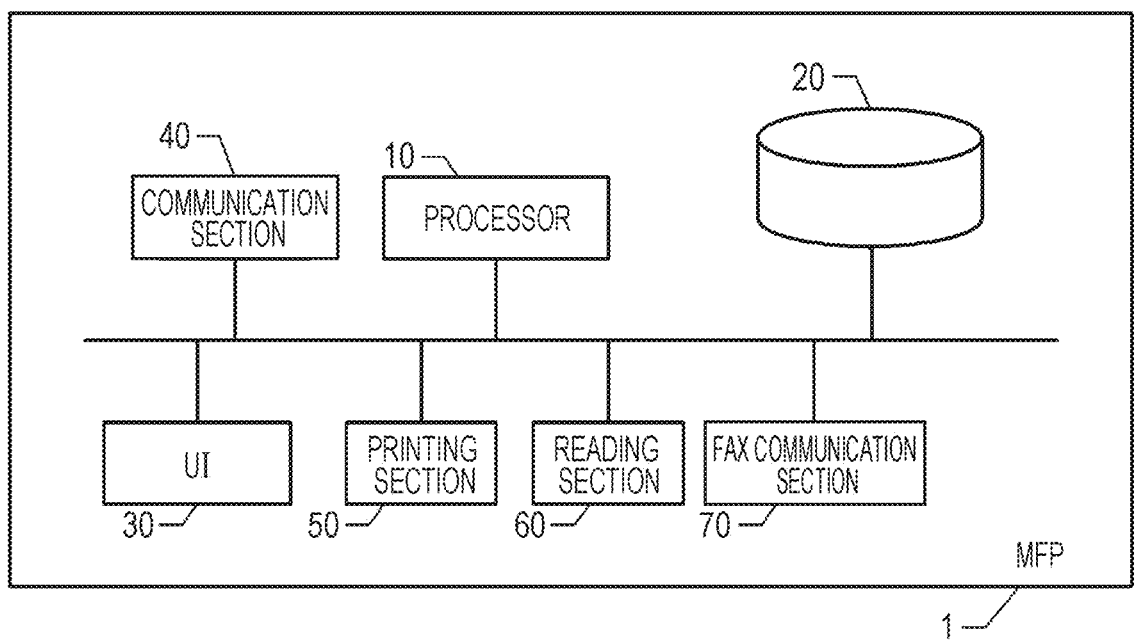
FIG. 1 is a block diagram of a multifunction printer (MFP), which acts as an electronic apparatus according to an embodiment of the present disclosure.

Some embodiments of the present disclosure will be described below in order. It should be noted that user authentication, certification, login, logout, and sign-in are regarded as the same procedure under the conception herein.
1. Configuration of Multifunction Printer (MFP)
1-1. First Login
1-2. Second Login
2. Function Execution Process
3. Other Embodiments
1. Configuration of MFP FIG. 1 is a block diagram of a multifunction printer (MFP) 1, which acts as an electronic apparatus according to an embodiment of the present disclosure. The MFP 1 includes a processor 10, nonvolatile memory 20, a user interface (UI) 30, a communication section 40, a printing section 50, a reading section 60, and a facsimile (fax) communication section 70. The processor 10, which includes a central processing unit (CPU), read-only memory (ROM), and random-access memory (RAM), executes various programs stored in the nonvolatile memory 20, thereby controlling the individual sections in the MFP 1. The processor 10 may be implemented by one or more chips. Alternatively, the processor 10 may include an application-specific integrated circuit (ASIC) instead of the CPU or include both the CPU and the ASIC that operate in cooperation with each other.

Examples of the UI 30 include a touch panel display, keys, and switches. The touch panel display includes: a display panel that displays various information under the control of the processor 10; and a touch panel that is mounted over the display panel and detects touches of a user's finger, for example. The processor 10 receives a user's operation through the UI 30 and causes the UI 30 to display various information in its display, thereby informing a user of the information.

The communication section 40 includes: a first communication interface that conducts wired or wireless communication with an external apparatus in conformity with any given communication protocol; and a second communication interface that communicates with various removal memory devices attached to the MFP 1. Furthermore, the communication section 40 includes a near field communication (NFC) section that communicates with an NFC tag present within a predetermined distance away from the MFP 1 and that acquires data stored in a recording medium of the NFC tag. Optionally, the NFC section transmits data to the NFC tag and stores the data in the recording medium of the NFC tag.

In this embodiment, the printing section 50 includes an actuator, a sensor, a drive circuit, and a machine component, all of which perform a printing operation on various print media in accordance with any given printing scheme, such as ink jet or electrophotographic scheme. The reading section 60 includes a known color image sensor, an optical source, and other relating devices that read an original sheet placed on an original sheet glass table or an automatic document feeder (ADF) original sheet tray and further includes an actuator, a drive circuit, a sensor, and machine components that feed the original sheet. The fax communication section 70 includes: a modem that faxes image data on the original sheet via a public switched telephone network (PSTN), for example; a circuit that generates or detects a control signal for use in transmitting or receiving the image data; and another circuit that encodes data to be transmitted or decodes received data.

In this embodiment, the MFP 1 can be installed inside an office or other room and shared by a plurality of users having different attributes. For example, the user belongs to different organizations (e.g., companies and departments), occupations, posts, and projects. The MFP 1 can assign different authorizations (use limitations) to respective users, depending on their attributes. For example, the MFP 1 permits a user having an attribute A to use all the functions without limitations but permits a user having an attribute B only to make copies up to a predetermined number of times.

The functions of the MFP 1 can be broadly classified into a print function, a copy function, a scan function, a fax function, a wireless communication function, and a setting function. Each of those functions is further classified into one or more sub-functions. For example, the scan function is classified into the functions "scan to my mail" and "scan to cloud". The function "scan to my mail" corresponds to a function of transmitting a mail with scan data to a mail address preregistered in relation to a login user. The function "scan to cloud" corresponds to a function of uploading the scan data to a cloud server preregistered in relation to a login user. In this embodiment, in relation to the above functions and sub-functions as well as combinations of some of the functions to be performed in order or at one time, for example, icons or buttons are displayed on a function selection screen (user home screen) in the touch panel display or a home top screen in the MFP1; details of the home top screen will be described later. Those icons or buttons indicate the functions, the sub-functions, and the combinations of the functions. In this embodiment, the "function" refers to an event to be taken place in response to the execution of a set of programs linked to an icon on the screen. It should be noted that the icons do not necessarily have to be provided in relation to the respective functions. Alternatively, a function menu list written in words may be provided instead.

The MFP 1 requests user authentication from users having different attributes before performing the functions. In this embodiment, the MFP 1 requests a first login and a second login from a user as the user authentication before performing a predetermined function. In this case, the UI 30 displays one or more first buttons in the touch panel display so that the user can perform the first login. Likewise, the UI 30 displays a second button in the touch panel display so that the user can perform the second login.

Figure 2:
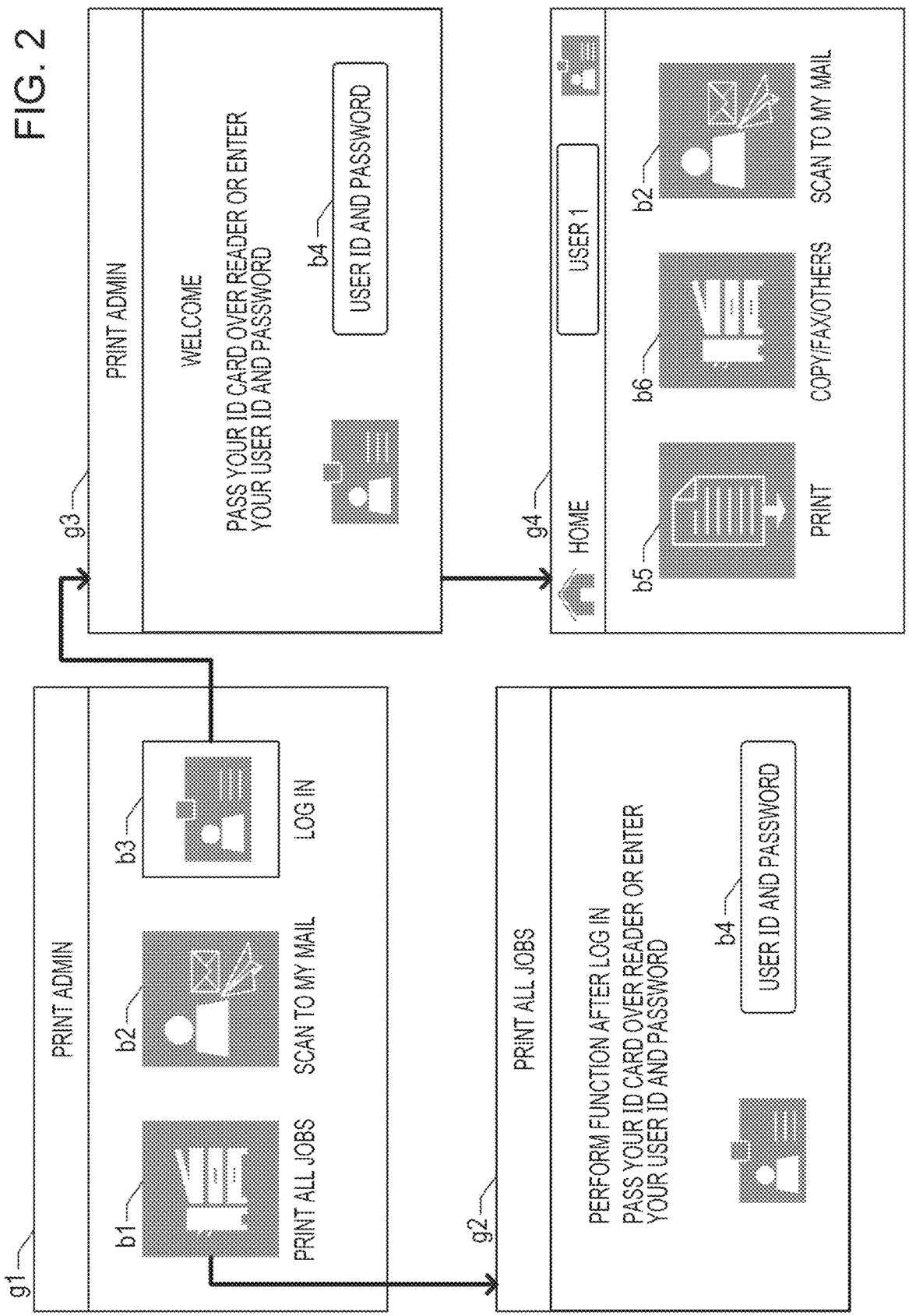
FIG. 2 illustrates an example of screens displayed in the electronic apparatus.

FIG. 2 illustrates an example of screens displayed in the MFP 1, in which a reference character g1 denotes an example of a home top image. The home top screen g1 appears as a basic screen when a user performs a logout operation. On the home top screen g1, buttons b1 and b2 correspond to the first buttons, and button b3 corresponds to the second button. The first buttons, or buttons b1 and b2, are used to perform the first login, whereas the second button b3, or the button B3, is used to perform the second login; the buttons b1 to b3 are arranged in parallel to one another. Providing the first buttons and the second button in this manner enables a user to recognize that it is possible to perform the first login and the second login.

1-1. First Login

The MFP 1 is configured to perform a plurality of functions. Further, the MFP 1 is configured to perform some of those functions in order as a single preset function. In this case, it is necessary to preset a setting value (parameter) and the sequence order. This presetting may be performed in advance by the administrator or a manufacturer of the MFP 1. Each of the first buttons is linked to a preset function or a function to be performed with a default setting value. In short, each first button is linked to one setting or one function. For example, one of the first buttons is linked to a first setting of a first function; the other of the first buttons is linked to a second setting of the first function; and the second button is linked to a second function.

On the home top screen g1 in FIG. 2, one first button, or a button b1 in this case, is linked to the function "print all jobs" and the other first button, or a button b2, is linked to the function "scan to my mail". Furthermore, the second button, or a button b3, is provided in parallel to both of the buttons b1 and b2. The MFP 1 stores print jobs in the nonvolatile memory 20 in relation to each user. The function "print all jobs" corresponds to a function of performing, at one time, one or more print jobs for a login user that are stored in the MFP 1 and that have not yet been performed. This function enables the MFP 1 to perform the print jobs for a user when he/she is present near the MFP 1, in which case the resultant print material is less likely to be passed to a third party.

In this embodiment, the operation of a first button serves as both an operation of selecting a function to be used and an operation of instructing the display of a screen that waits for the first login. Then, in this embodiment, the user can perform a login operation through the screen that waits for the first login. When the user authentication is a success, the login operation serves as both an operation of instructing the execution of a predetermined function and an operation of instructing automatic logout after the execution of the function.

When the user operates a first button, or the button b1 in this case, on the home top screen g1 displayed in the touch panel display, for example, the processor 10 causes the UI 30 to display a first login screen g2 that encourages the user to perform the first login. In this case, the displaying of the first login screen g2 in the touch panel display implies that the MFP 1 is ready to accept the first login.

The first login screen g2 in FIG. 2 is related to the function "print all jobs". If the user operates the other first button on the home top screen g1, the processor 10 may cause the UI 30 to display a first login screen that gives a message different from that in the first login screen g2. For example, if the user operates the button b2 linked to the function "scan to my mail" on the home top screen g1, the processor 10 may cause the UI 30 to display a first login screen (not illustrated) that gives a message that encourages the user to place an original sheet on the ADF before the login operation. This message means that any preparation for performing the function is preferably completed before the login operation. In this embodiment, as described above, the MFP 1 performs the function in response to the login operation for the first login.

In this embodiment, the success of the login implies that the user is a valid user permitted to operate the MFP 1. After the success of the login, the user can use permitted functions. The MFP 1 performs the user authentication through both user identification (ID) and a password or ID information stored in an ID card. If the user prefers to use his/her user ID and password for the user authentication, the user operates a button b4 on the first login screen g2. Then, the user enters his/her user ID and password in a letter entry screen (not illustrated) and operates a login button (not illustrated). In response to the entry of the user ID and the password, the processor 10 determines whether the user is a valid user permitted to use the function to which the operated first button is linked. For that purpose, the processor 10 refers to user management information (e.g., combinations of user IDs and passwords and information on users' authorization) stored in the nonvolatile memory 20 or in a server with which the communication section 40 can communicate. If the user is valid, the processor 10 determines that the first login is a success. For example, the information on users' authorization may be information indicating functions that the users permitted to use after the second login, the permission of use of the individual functions, and the limitations on the functions. Examples of the information indicating the permission of use of the functions include information regarding whether the first function (e.g., scan to my mail function) can be performed and the second function (e.g., the function of performing a printing operation on A3-sized sheets) can be performed. The use limitations may be limitations on the number of times, amounts, or types of the permitted functions.

If the user prefers to use the ID information stored in his/her ID card for the user authentication, the user needs to pass his/her ID card over the reader of the NFC communication unit in the MFP 1 while the UI 30 is displaying the first login screen g2, so that the reader can read the ID information stored in the ID card. In response, the processor 10 determines whether the user's ID information is contained in the user management information (e.g., the list of valid users and the authorization of the valid users) stored in the nonvolatile memory 20 (or the server) and whether the function to which the first button linked is permitted. When determining that the ID information is contained and the function is permitted, the processor 10 determines the first login is a success. Herein, both of the touch panel display in the UI 30 and the processor 10 that display an entry screen and receive a user ID and a password correspond to a first acceptor. Also, both of the NFC section and the processor 10 that acquire ID information from an ID card through the reader in the MFP 1 corresponds to the first acceptor.

When the first login is a success, the processor 10 causes the MFP 1 to perform a predetermined function to which the first button that has been operated before the first login is linked, only once without a user's operation. Herein, the processor 10 corresponds to an execution section. More specifically, the processor 10 causes the printing section 50, the reading section 60, the fax communication section 70, the communication section 40, and some other sections in the MFP 1 to perform the predetermined function.

For example, if the user passes the ID card over the reader in the NFC section while the UI 30 is displaying the first login screen g2 related to the function "print all jobs" and then the first login is a success, the processor 10 causes the MFP 1 to perform all the print jobs for this user which are stored in the nonvolatile memory 20. In this case, the user does not have to perform any operation between when the user has performed the login operation by passing the ID card and when the MFP 1 starts the print jobs for the user. When completing all the print jobs for the user, the processor 10 performs the logout operation without a user's operation and causes the UI 30 to display the home top screen g1 in the touch panel display again. In this embodiment, when the first login is a success, the processor 10 causes the MFP 1 to perform the predetermined function only once without a user's operation and then to automatically perform the logout operation. After that, the processor 10 bans the MFP 1 from performing any other function until the next first login or the second login has been a success. Thus, at least after the first login has been a success and the first-login user has used a function only once, the configuration does not permit a third party to use any function. Optionally, the UI 30 displays a screen indicating the progress of the print jobs and then a logout message before displaying the home top screen g1. Optionally, the processor 10 performs the logout operation in the course of performing the predetermined function.

In this embodiment, as described above, when the user operates a first button on the home top screen g1 and then the first login is a success, the processor 10 causes the MFP 1 to perform the function to which the operated first button is linked so that a user does not have to perform an operation of selecting a function. In this case, the operation of the first button serves as the operation of selecting a function, thereby reducing a user's burden of performing many operations.

As described above, when the user performs the first login, the processor 10 causes the MFP 1 to perform a predetermined function only once without a user's operation and then bans a third party from performing any operation without an user's explicit operation, such as a logout operation. This configuration, at least after having accepted the first login, successfully reduces the risk of the MFP 1 operated by a third party. In addition, After the first login, the configuration does not require a user's operation, such as an operation of selecting a function, thereby reducing a user's burden of performing many operations, namely, successfully providing improved usability for the user.

1-2. Second Login

Next, an operation of the second login will be described. When the user operates the second button, or the button b3, on the home top screen g1 of FIG. 2 displayed in the touch panel display, the processor 10 causes the UI 30 to display a second login screen g3 that encourages the user to perform the second login. In this case, the displaying of the second login screen g2 in the touch panel display implies that the MFP 1 is ready to accept the second login.

To accept the second login, the MFP 1 needs to perform the user authentication through a user ID and a password or ID information stored in an ID card, as in the case of the first login. Thus, the user enters his/her user ID and password through the touch panel display or passes his/her ID card over the reader of the NFC section. Then, when determining that the user is valid, the processor 10 determines that the second login is a success.

Herein, both of the touch panel display in the UI 30 and the processor 10 that display the second login screen g3 and an entry screen and then receive a user ID and a password correspond to a second acceptor. Also, both of the NFC section and the processor 10 that acquire ID information from an ID card through the reader in the MFP 1 corresponds to the second acceptor.

When the second login is a success, the processor 10 causes the UI 30 to display a function selection screen in the touch panel display. In FIG. 2, a user home screen g4 corresponds to this function selection screen. The user home screen g4 shows the list of the icons indicating respective functions that the second-login user is permitted to use. The icons on the user home screen g4 may change depending on the user's authorization. For example, the user home screen g4 does not have to show icons linked to the functions that the second-login user is not permitted to use. Alternatively, the user home screen g4 may show the icons linked to unpermitted functions in a grayed-out fashion. Optically, the contents of the user home screen g4 are customized for each second-login user. For example, the arrangement of the icons or the layered structure may be changed. The user home screen g4 may further indicate information on the second-login user, such as his/her user ID or name.

In this embodiment, the administrator or the manufacturer of the MFP 1 preselects the functions that the first-login user is permitted to use from among those that the second-login user is permitted to use. In this case, for example, the administrator or the manufacturer preselects a function to be used frequently by users, a function to be performed with a default setting value, or a series of functions to be performed in order in the MFP 1. Preselecting functions in this manner allows the first-login user to use those functions with just a few operations. Furthermore, the MFP 1 may permit the second-login user to use many other functions in addition to the above functions. In this way, the MFP 1 enables the second-login user to select and use a desired function, such as a function to be used less frequently or a function that the first-login user is permitted to use but involves changing setting values.

In this embodiment, the number of functions that the second-login user is permitted to use is larger than that the first-login user is permitted to use. Moreover, the first-login user can use a few specific functions only once with just a few operations, whereas the second-login user can use many more functions without any additional login operation.

If the second-login user performs a logout operation or does not perform an operation over a predetermined period after the second login has been a success, the processor 10 bans the MFP 1 from performing any function until the first login or the next second login is a success. More specifically, when the reader of the NFC section reads the ID card of the second-login user while the UI 30 is displaying the user home screen g4 of FIG. 2, the processor 10 determines that the user explicitly performs the logout operation and thus logs out. The "log out" recited in this embodiment means getting out of the login state. In this case, the user can no longer use all the functions of the MFP 1 until he/she performs the first login or the second login. Optionally, the UI 30 displays a logout button (not illustrated) in the touch panel display, in which case the processor 10 may log out in response to the operation of the logout button.

If the second-login user does not perform an operation over the predetermined period, the processor 10 automatically logs out. In this embodiment, after the second-login user has explicitly performed a logout operation, the MFP 1 does not permit a third party's operation. In this embodiment, if the second-login user does not perform an operation over the predetermined period, the processor 10 automatically logs out and thus does not permit users to use any function until the first or next second login is a success. Even if the second-login user fails to explicitly perform the logout operation, the processor 10 automatically logs out as described above. Therefore, the MFP 1 is less likely to be used by a third party than any other MFP that lacks this automatic logout configuration.

When the second-login user operates one of the buttons arranged on the user home screen g4 to select a desired function, for example, the processor 10 may use the UI 30 to display a detailed setting screen (not illustrated) related to the function to which the operated button is linked. Then, the user may change a setting value to a desired value if necessary and operates an execution button on the detailed setting screen. In response, the processor 10 may reflect the changed or default setting value and cause the MFP 1 to perform the function. As described above, when the second button is operated by the user, the processor 10 causes the MFP 1 to perform the function selected by the user after user has performed the second login. This configuration permits the user to, for example, sequentially use a plurality of functions or use the same function a plurality of times without requesting the user to perform the login operation again, thereby providing improved usability for the user.

The processor 10 may cause the UI 30 to display the progress of the function being performed. After the MFP 1 has completed the function, the processor 10 causes the UI 30 to display the user home screen g4 again without automatically logging out, as opposed to the operation in the case of the first login. As a result, the processor 10 permits the second-login user to perform another function without an additional login operation. In short, the processor 10 permits the second-login user to perform a plurality of functions a plurality of times. Therefore, the second-login user does not have to perform a login operation again when using functions a plurality of times. In other words, the second-login user can use perform a plurality of functions a necessary number of times. This configuration provides improved usability for the user who needs to perform a plurality of functions a plurality of times.

In this embodiment, as described above, the MFP 1 gives the user the two selections: the use of a predetermined function with just a few operations; and the use of a plurality of functions, the same functions a plurality of times, or a function with its setting value changed. If the user selects the use of the predetermined function with just a few operations, he/she operates the first button to which this function is linked and then performs the first login. In response, the processor 10 causes the MFP1 to perform the function and then automatically logs out. This configuration successfully reduces the risk of the MFP 1 operated by a third party after the first login. On the other hand, if the user selects the use of a plurality of functions, the same functions a plurality of times, or a function with its setting value changed, the user operates the second button and performs the second login. Then, the second-login user repeatedly selects one or more desired operations and instructs the execution of the selected operations. In response, the processor 10 causes the MFP 1 to perform those functions a desired number of times. After The MFP 1 has completed all the functions, the second-login user explicitly performs the logout operation so that the processor 10 logs out. Even if the second-login user fails to explicitly perform the logout operation, when he/she does not perform an operation over a predetermined period, the processor 10 automatically logs out. This configuration also successfully reduces the risk of the MFP 1 operated by a third party after the second login. The MFP 1 that can accept both the first login and the second login is less likely to be operated accidentally than any other MFP that can accept only the second login. For example, if the user tends to miss performing the logout operation, the administrator may assign the authorization to the user in such a way that he/she can perform only the first login, thereby reducing the risk of the MFP 1 operated accidentally. If the user tends to reliably perform the logout operation, the administrator may assign the authorization to the user in such a way that he/she can perform both the first login and the second login, thereby providing the improved usability.

2. Function Execution Process

Figure 3:
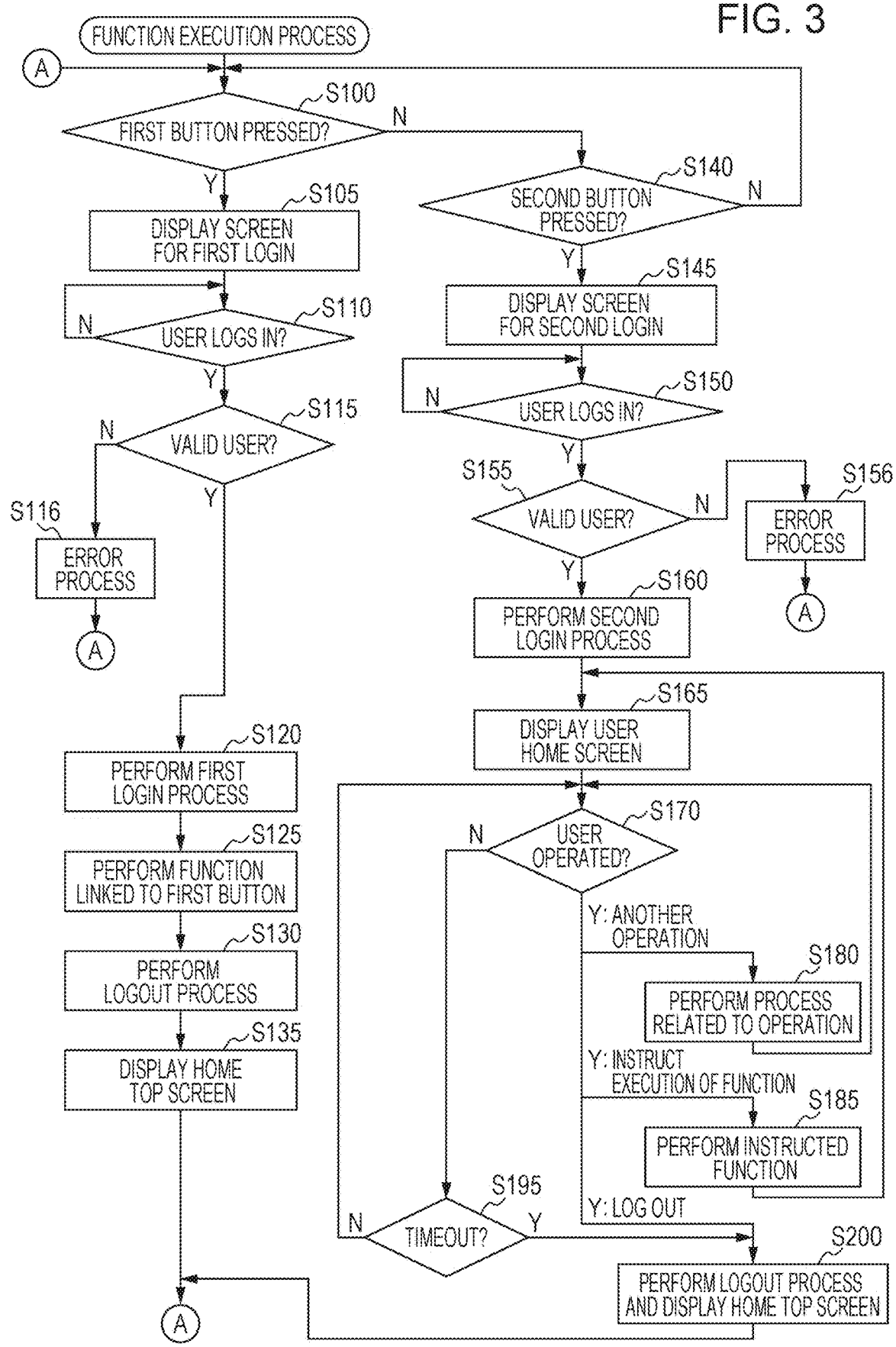
FIG. 3 is a flowchart of a function execution process performed by the electronic apparatus.

FIG. 3 is a flowchart of a function execution process performed by the processor 10 in the MFP 1. When the processor 10 performs the function execution process, the UI 30 displays the home top screen g1 in the touch panel display.

The function execution process starts with Step S100, at which the processor 10 determines whether the user operates a first button. When determining that the user operates a first button (Y at Step S100), at Step S105, the processor 10 causes the UI 30 to display a screen that encourages the user to perform the first login. For example, while the UI 30 is displaying the home top screen g1 of FIG. 2, the processor 10 determines whether the user operates one of the buttons b1 and b2, based on a signal from the touch panel display in the UI 30. When determining that the user operates the button b1 or b2, the processor 10 causes the UI 30 to display, in the touch panel display, a first login screen, such as the first login screen g2, related to the function to which the touched button b1 or b2 is linked.

At Step S110, the processor 10 waits for the first login. When detecting the first login (Y at Step S110), at Step S115, the processor 10 determines whether the user is valid. More specifically, the processor 10 determines whether the user enters his/her user ID and password and operates the login button or whether the user passes his/her ID card over the reader of the NFC section. When detecting a login operation as described above, the processor 10 determines whether the user is a valid user permitted to use the function to which the operated first button is linked, based on the user management information stored in the nonvolatile memory 20 or in the server.

When determining that the user is invalid at Step S115 (N at Step S115), at Step S116, the processor 10 performs an error process and makes this function execution process return to Step S100. In the error process, the processor 10 may cause the UI 30 to display an error message for several seconds and then the home top screen or to display an error log.

When determining that the user is valid at Step S115 (Y at Step S115), at Step S120, the processor 10 determines that the first login is a success and then performs a first login process. The first login process refers to a process that the processor 10 performs in response to the success of the first login. In this first login process, the processor 10 may store the log of a login date and time, the ID information on the first-login user, and the function to be performed after the first login, for example, in the nonvolatile memory 20.

At Step S125, the processor 10 performs the function to which the first button is linked. More specifically, the processor 10 identifies to which function the first button that has been operated at Step S100 is linked and causes predetermined sections in the MFP 1 to perform the identified function. During the execution of this function, the processor 10 may cause the UI 30 to display a progress bar indicating the progress in the touch panel display.

At Step S130, the processor 10 performs a logout process. In this embodiment, the processor 10 performs the logout process after the MFP 1 completes the function that has been performed at Step S125; however, the processor 10 may perform the logout process before the MFP 1 completes the function, namely, when the MFP 1 is performing the function. If an error, such as a sheet jam or a runout of ink, occurs during the execution of the function, the processor 10 may encourage the user to take any action against this error regardless of whether the MFP 1 is in the login or logout state. The logout process may refer to a process in which the processor 10 clears the login state in the MFP 1 or stores the logout date and time in the nonvolatile memory 20 in relation to the first-login user.

At Step S135, the processor 10 causes the UI 30 to display the home top screen and then makes this function execution process return to Step S100. In this embodiment, after having completed the logout process, the processor 10 causes the UI 30 to display the home top screen g1 of FIG. 2 again and waits for a user's operation.

When not determining that the user operates the first button at Step S100 (N at Step S100), at Step S140, the processor 10, in turn, determines whether the user operates the second button. When not determining that the user operates the second button at Step S140 (N at Step S140), the processor 10 makes this function execution process return to Step S100. When determining that the user operates the second button at Step S140 (Y at Step S140), at Step S145, the processor 10 causes the UI 30 to display a screen that encourages the user to perform the second login. More specifically, for example, when the user operates the second button, or the button b3, on the home top screen g1 of FIG. 2, the processor 10 causes the UI 30 to display the second login screen g3 in the touch panel display.

At Step S150, the processor 10 waits for the second login. When detecting the second login (Y at Step S150), at Step S155, the processor 10 determines whether the user is valid. In this case, a specific process at Step S150 is substantially the same as that at Step S110, and a specific process at Step S155 is substantially the same as that at Step S115. When determining that the user is invalid (N at Step S155), at Step S156, the processor 10 performs an error process and then makes the function execution process return to Step S100. This error process is substantially the same as that at Step S116.

When determining that the user is valid (Y at Step S155), at Step S156, the processor 10 determines that the second login is a success and then performs a second login process at Step S160. The second login process refers to a process that the processor 10 performs in response to the success of the second login. In the second login process, the processor 10 may refer to the authorization information, such as use limitations, on the second-login user and may store the log of a login date and time and functions to be performed after the second login, for example, in the nonvolatile memory 20.

At Step S165, the processor 10 causes the UI 30 to display the user home screen. More specifically, the processor 10 causes the UI 30 to display the user home screen, such as the user home screen g4 of FIG. 2, in the touch panel display, depending on the second-login user.

At Step S170, the processor 10 determines whether the second-login user performs the logout operation, an operation of instructing the execution of a function, or any other operation on the user home screen. When determining that the user performs any other operation, at Step S180, the processor 10 performs the process related to this operation and then returns this function execution process return to Step S170. Examples of any other operation include: an operation of selecting a function; and an operation of changing parameters for the selected function. Then, the processor 10 may cause the UI 30 to display a detailed setting screen for the function selected through the user's operation of selecting a function or may change the parameters in accordance with the user's operation of changing parameters.

When determining that the user performs the operation of instructing the execution of a function at Step S170, at Step S185, the processor 10 causes the MFP 1 to perform this function, for example, in accordance with the parameters changed at Step S180. In short, the processor 10 causes predetermined sections in the MFP 1 to perform the function designated through the user's operation of instructing the execution of a function at Step S170. During the execution of the function, the processor 10 may cause the UI 30 to display a progress bar indicating the progress in the touch panel display. Then, the processor 10 makes this function execution process return to Step S165 and then causes the UI 30 to display the user home screen. In short, after the MFP 1 has completed the function, the processor 10 resets, for example, the parameters changed at Step S180 and then causes the UI 30 to display the user home screen g4 again so that the user can select another function. Alternatively, the processor 10 may make this function execution process return to Step S170 and then continues the process with the parameters kept unchanged.

When determining that the user performs the logout operation at Step S170, at Step S200, the processor 10 performs a logout process and then causes the UI 30 to display the home top screen. This logout process is substantially the same as that at Step S130. After the MFP 1 has performed the process at Step S200, the processor 10 makes this function execution process return to Step S100. More specifically, for example, when the reader of the NFC section reads the ID card, the processor 10 determines that the second-login user explicitly performs the logout operation. Alternatively, when the user operates the logout button in the touch panel display, the processor 10 may determine that the user explicitly performs the logout operation.

When determining that the user does not perform any operation, at Step S195 (N at Step S170), the processor 10 determines whether a timeout occurs. More specifically, the processor 10 measures a period of time elapsed since the user's last operation, namely, a period over which the second-login user does not perform an operation. When this period reaches a predetermined period, the processor 10 determines the timeout occurs. When the MFP 1 is in a specific state, such as when the MFP 1 is in a state of rejecting a user's operation or when the MFP 1 is performing a function, the processor 10 may temporarily stop measuring the elapsed period.

When not determining that the timeout occurs at Step S195 (N at Step S195), the processor 10 makes this function execution process return to Step S170. When determining that the timeout occurs at Step S195 (Y at Step S195), at Step S200, the processor 10 performs the logout process and causes the UI 30 to display the home top screen, as in the case where the processor 10 determines that the second-login user performs the logout operation at Step S170. This logout process is substantially the same as that at Step S130. After the MFP 1 has performed the process at Step S200, the processor 10 makes this function execution process return to Step S100.

As illustrated in the flowchart of FIG. 3, after the second login, the processor can perform the processes at Steps S165 to S185 a plurality of times. Thus, once performing the second login process at Step S160, the processor 10 can perform a plurality of functions a plurality of times, as opposed to the case after the first login. However, the processor 10 makes the timeout determination at Step S195 because the user may temporarily stop performing operations.

3. Other Embodiments

The foregoing embodiment is an example for use in implementing the present disclosure; therefore some other embodiments are conceivable. An electronic apparatus may be any apparatus that requires user authentication before operated by the user. In that sense, the electronic apparatus may be implemented by not only an MFP but also a printer, a personal computer, a smartphone, or a tablet, for example.

A first acceptor only has to accept a first login; a second acceptor only has to accept a second login. The user authentication for the first login and the second login may be "what you have (WYH)" authentication in which an NFC tag on an ID card is read and "what you know (WYK)" authentication in which a user ID and a password are entered, as described in the foregoing embodiment. Alternatively, the user authentication for the first login and the second login may be fingerprint authentication, biometric authentication, or "what you are (WYA)" authentication. First buttons and a second button may be implemented by either soft keys displayed in a touch panel display or hard keys provided in advance in the electronic apparatus. The number of first buttons provided is not limited; for example, a single first button may be provided. Each first button and the second button preferably create conceptionally uniform layout and exterior designs; however, each first button and the second button preferably create different uniform layout and exterior designs, in which case a user can easily distinguish between each first button and the second button. The electronic apparatus does not necessarily use keys when requesting a user to perform the first login or the second login. Alternatively, for example, the electronic apparatus may perform the user authentication for the first login in response to the entry of a user carrying an ID card within a first area, whereas the electronic apparatus may perform the user administration for the second login in response to the entry of the user carrying the ID card within a second area.

Functions that the electronic apparatus performs after the first login has been a success may be those to be performed frequently with their parameters being default or preset values. Therefore, the electronic apparatus may monochromatically copy only one side of an original sheet after the first login, in addition to the functions of the MFP 1 described in the embodiment. Moreover, the electronic apparatus may automatically and selectively perform a function after the first login, depending on the situation. For example, when a user operates the first button linked to a function "scan to my mail" on a home top screen (g1), the execution section may detect on which of an original sheet table and an ADF an original sheet is placed. Then, when the original sheet is placed on the original sheet table, the execution section may cause the electric apparatus to scan the original sheet on the original sheet table. When the original sheet is placed on the ADF, the execution section may cause the electric apparatus to scan the original sheet on the ADF. In this way, the execution section may switch functions as appropriate.

When the first login is a success, the execution section only has to cause the electric apparatuses to perform a predetermined function only once without a user's operation. When the second login is a success, the execution section only has to cause the electric apparatuses to perform a function in accordance with a user's operation. In the foregoing embodiment, the operation of a first button serves as both an operation of selecting a function and an operation of displaying a screen that waits for the first login, and the operation of the first login serves as both an operation of instructing the execution of the selected function and, followed by, an operation of instructing automatic logout. In this embodiment, the processor 10 in the MFP 1 does not request a user to select a function and to instruct the execution of the selected function after the first login has been a success. This configuration thereby successfully decreases a user's burden of performing many operations; however, this configuration is not limited and thus may undergo some modifications. Alternatively, the execution section only has to reduce a user's burden of selecting a function. More specifically, the execution section may request the user to perform the operation of instructing the execution of the selected operation and some other operations. For example, when the user operates the first button linked to the function "scan to my mail" on the home top screen (g1), the execution section may request the user to perform the operation of instructing the execution of the scan after the first login. In this case, the execution section does not necessarily have to request the user to place an original sheet on the original sheet table or the ADF before the user performs the loin operation. If requesting the user to perform the operation of instructing the execution of the selected function after the first login, the execution section does not necessarily have to request the user to perform the operation of selecting a function after the first login. In this case, after the first login has been a success, the execution section may cause the electric apparatus to perform the operation of selecting a function only once without a user's operation.

In the foregoing embodiment, the execution section requests the user to operate a first button and then to perform the first login; however, the execution section requests the user to operate a first button in the curse of the first login. In this case, the execution section cannot identify which of the first login and the second login the user has performed. Thus, the execution section may determine the first login is a success in response to the operation of a first button after the login operation. Likewise, the execution section may determine the second login is a success in response to the operation of the second button after the login operation. More specifically, the execution section may request the user to pass his/her ID card over the reader of the NFC section and to simultaneously perform the first button or the second button.

The electronic apparatus does not have to request the user to explicitly perform the logout operation. After the first login has been a success, the execution section may perform the predetermined function only once without a user's operation and then may ban the electric apparatus from performing any function until the next first login or the second login is a success. As opposed to the foregoing embodiment, the execution section does not necessarily have to automatically log out. The execution section may maintain the login state but may ban the electric apparatus from performing an operation until the next first login or the second login has been a success. Alternatively, the execution section may log out between the start of a predetermined function and the completion of the predetermined function or after the completion of the predetermined function.

The electronic apparatus does not necessarily have to include the second acceptor that accepts the second login. In other words, the electronic apparatus may include only the first acceptor that receives the first login and the execution section. In this case, after the first login is a success, the execution section may perform a predetermined function only once without a user's operation. More specifically, the execution section may cause the electric apparatus to display a plurality of first buttons linked to respective functions, including a preset function, on the home top screen (g1 of FIG. 2), instead of the second button (button b3). In response to the operation of one of the first buttons, the execution section may perform the first login process (at Steps S100 to S135).

In the foregoing embodiment, the electronic apparatus reads an ID card after the user has operated a first button (button b1 or b2) or the second button (button b3) on the home top screen (g1). However, when the user passes his/her ID card over the reader of the NFC section during the displaying of the home top screen (g1), the execution section may cause the electric apparatus to display the user home screen (g4) instead of the second login screen (g3).

The present disclosure may be implemented in the form of a method or a program to be executed by a computer. The foregoing system, program, and method may contain various aspects and be implemented by a single apparatus or components in a plurality of apparatuses. The present disclosure may undergo some modifications as appropriate and be partly implemented by software and/or hardware. Alternatively, the present disclosure may be implemented by a non-transitory computer-readable storage medium that stores a program for controlling the system. Examples of the non-transitory computer-readable storage medium for the program include magnetic recording media, semiconductor memories, and any other recording media that are currently under development or will be developed in the future.

What is claimed is:

1. An electronic apparatus comprising:
   a first acceptor configured to accept a first login;
   a second acceptor configured to accept a second login; and
   a processor configured to:
      cause the electronic apparatus to perform, when the first login is a success, a predetermined function only once without a user operation and ban the electronic apparatus from performing any function until a next first login or the second login is a success; and
      cause the electronic apparatus to perform a function in accordance with the user operation when the second login is a success.

2. The electronic apparatus according to claim 1, wherein when the second login is a success, the processor is further configured to permit a user to use a function a plurality of times.

3. The electronic apparatus according to claim 1, wherein after the success of the second login, the processor is further configured to ban the electronic apparatus from performing any function in response to an event in which a user performs a logout operation or in which the user does not perform an operation over a predetermined period and continues to ban the electronic apparatus from performing any function until the first login or a next second login has been a success.

4. The electronic apparatus according to claim 1, further comprising:
   one or more first buttons through which the first login is accepted; and
   a second button through which the second login is accepted, the first buttons and the second button being arranged in parallel to one another.

5. The electronic apparatus according to claim 4,
   the electronic apparatus is configured to perform a plurality of functions,
   one of the first buttons is linked to a first function,
   another of the first buttons is linked to a second function,
   the first buttons and the second button are arranged in parallel to one another,
   when one of the first buttons is operated, the processor is further configured to cause the electronic apparatus to perform a function to which the operated first button is linked without requesting a user to perform an operation of selecting a function after the first login, and
   when the second button is operated, the processor is further configured to request the user to perform the operation of selecting a function and cause the electronic apparatus to perform the selected function after the second login.

6. The electronic apparatus according to claim 1, wherein the electronic apparatus is configured to perform a plurality of functions, and
   the processor is further configured to permit a user to use more functions after the second login than after the first login.

7. The electronic apparatus according to claim 6, wherein the functions that the processor permits the user to use after the first login are preselected from among those that the processor permits the user to use after the second login.

8. An electronic apparatus comprising:
a first acceptor configured to accept a first login;
a second acceptor configured to accept a second login;
a processor configured to:
- cause the electronic apparatus to perform a predetermined function only once without a user operation when the first login is a success; and
- cause the electronic apparatus to perform a function in accordance with the user operation when the second login is a success;

one or more first buttons through which the first login is accepted; and
a second button through which the second login is accepted, wherein
- the first buttons and the second button are arranged parallel to one another,
- the electronic apparatus is configured to perform a plurality of functions,
- one of the first buttons is linked to a first function,
- another of the first buttons is linked to a second function,
- when one of the first buttons is operated, the processor is further configured to cause the electronic apparatus to perform a function to which the operated first button is linked without requesting a user to perform an operation of selecting a function after the first login, and
- when the second button is operated, the processor is further configured to request the user to perform the operation of selecting a function and cause the electronic apparatus to perform the selected function after the second login.

9. An electronic apparatus comprising:
a first acceptor configured to accept a first login;
a second acceptor configured to accept a second login; and
a processor configured to:
- cause the electronic apparatus to perform a predetermined function only once without a user operation when the first login is a success; and
- cause the electronic apparatus to perform a function in accordance with the user operation when the second login is a success, wherein
  - the electronic apparatus is configured to perform a plurality of functions, and
  - the processor is further configured to permit a user to use more functions after the second login than after the first login.

* * * * *